(12) United States Patent
Morisada et al.

(10) Patent No.: US 7,649,940 B2
(45) Date of Patent: Jan. 19, 2010

(54) IMAGE ENCODING APPARATUS AND METHOD

(75) Inventors: Hidehiko Morisada, Tokyo (JP); Makoto Yamada, Tokyo (JP)

(73) Assignee: Sony Corporation, Tokyo (JP)

(*) Notice: Subject to any disclaimer, the term of this patent is extended or adjusted under 35 U.S.C. 154(b) by 775 days.

(21) Appl. No.: 10/398,687

(22) PCT Filed: Aug. 6, 2002

(86) PCT No.: PCT/JP02/08036

§ 371 (c)(1),
(2), (4) Date: Oct. 27, 2003

(87) PCT Pub. No.: WO03/017675

PCT Pub. Date: Feb. 27, 2003

(65) Prior Publication Data

US 2004/0066975 A1    Apr. 8, 2004

(30) Foreign Application Priority Data

Aug. 9, 2001    (JP)    ............................. 2001-241543

(51) Int. Cl.
H04N 11/04    (2006.01)
(52) U.S. Cl. ............................. 375/240.05; 375/240.03; 375/240.16; 382/239; 382/251
(58) Field of Classification Search ............ 375/240.03, 375/240.12, 240.16; 382/232, 238, 239, 382/251

See application file for complete search history.

(56) References Cited

U.S. PATENT DOCUMENTS 6,011,589 A * 1/2000 Matsuura et al. ....... 375/240.14
RE36,761 E * 7/2000 Fujiwara ................ 375/240.03
6,151,360 A * 11/2000 Kato et al. ............. 375/240.03

(Continued)

FOREIGN PATENT DOCUMENTS

EP    0 848 559    6/1998

(Continued)

OTHER PUBLICATIONS

King N Ngan et al: "Adaptive Cosine Transform Coding of Images in Perceptual Domain" IEEE Transactions on Acoustics, Speech and Signal Processing, IEEE Inc. New York, US, vol. 37, No. 11, Nov. 1, 1989, pp. 1743-1749, XP000074460 ISSN: 0096-3518.

*Primary Examiner*—Marsha D Banks Harold
*Assistant Examiner*—Christopher Findley
(74) *Attorney, Agent, or Firm*—Frommer Lawrence & Haug LLP; William S. Frommer; Paul A. Levy (57) ABSTRACT

The invention relates to an image coding apparatus which can improve the picture quality of an image. A quantization scale arithmetic operation section 43 calculates a coefficient of a quantization index based on a variance of values of a motion vector residual outputted from a motion vector residual variable buffer section 72 and an activity outputted from an activity buffer section 73. The quantization scale arithmetic operation section 43 calculates a quantization scale based on the coefficient of the quantization index calculated thereby and the quantization index outputted from the quantization index arithmetic operation section 42. The present invention can be applied to an image coding apparatus of the MPEG system.

6 Claims, 7 Drawing Sheets

U.S. PATENT DOCUMENTS

| | | | |
|---|---|---|---|
| 6,167,085 A | 12/2000 | Saunders et al. | |
| 6,816,617 B2 * | 11/2004 | Yamori et al. | 382/236 |
| 2001/0021272 A1 * | 9/2001 | Yamori et al. | 382/236 |
| 2002/0181583 A1 * | 12/2002 | Corbera | 375/240.03 |

FOREIGN PATENT DOCUMENTS

| | | |
|---|---|---|
| JP | 8-18959 | 1/1996 |
| JP | 8-163557 | 6/1996 |
| JP | 2000-270323 | 9/2000 |

* cited by examiner

IMAGE ENCODING APPARATUS AND METHOD

TECHNICAL FIELD

This invention relates to an image coding apparatus and method, and more particularly to an image coding apparatus and method by which the picture quality of an image can be improved.

BACKGROUND ART

Recently, an image compression technique represented by the MPEG (Moving Picture Experts Group) has been being developed.

Figure 1:
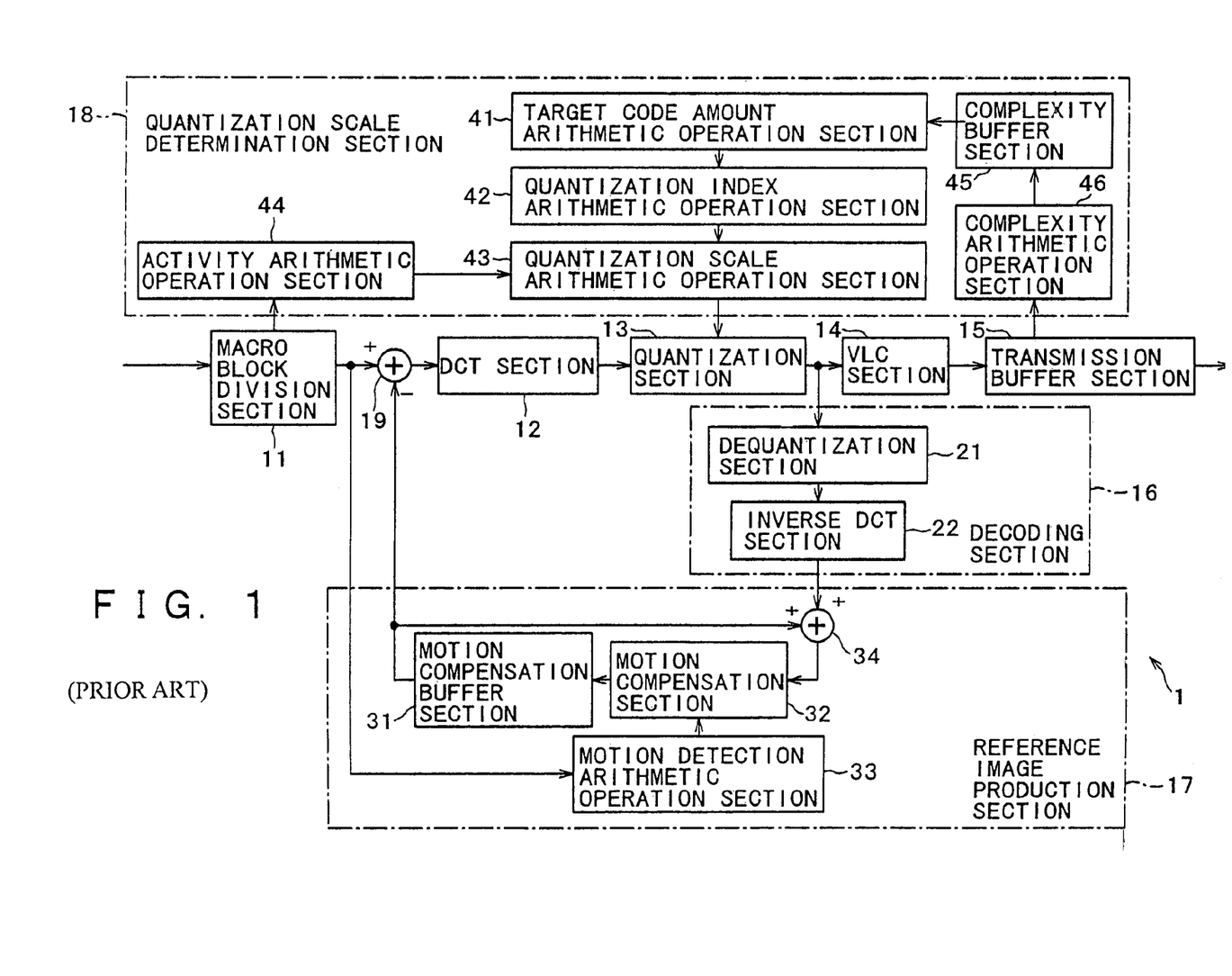
FIG. 1 is a block diagram showing an example of a configuration of a conventional image coding apparatus.

FIG. 1 shows a configuration of a conventional image coding apparatus 1 which uses such MPEG as mentioned above.

Referring to FIG. 1, a macro block division section 11 receives frame data as an input thereto, converts the frame data into data of a macro block (hereinafter referred to as MB), and outputs the data of the MB obtained by the conversion to a subtraction section 19, a quantization scale determination section 18 and a reference image production section 17.

The subtraction section 19 subtracts reference image data inputted from the reference image production section 17 from the data of the MB inputted from the macro block division section 11 (namely, the subtraction section 19 adds the reference image data in the reversed polarity to the data of the MB) and outputs difference data to a DCT section 12.

The DCT section 12 performs a DCT (Discrete Consign Transform) process for the difference data inputted from the subtraction section 19 to convert them into DCT coefficients and outputs the DCT coefficients to a quantization section 13.

The quantization section 13 quantizes the DCT coefficients inputted from the DCT section 12 with a quantization scale inputted from a quantization scale determination section 18 and outputs resulting values to a VLC section 14 and a decoding section 16.

The VLC section 14 performs a variable length coding process for the quantized data inputted from the quantization section 13 to convert the data into a VLC (Variable Length Code) and outputs the VLC to a transmission buffer section 15.

The transmission buffer section 15 outputs the VLC inputted thereto to the quantization scale determination section 18. Meanwhile, the transmission buffer section 15 converts, when the VLCs of the entire frame are inputted thereto, the VLCs into data in a unit of a frame and outputs the data as bit stream data to the outside.

In the decoding section 16, a dequantization section 21 dequantizes the quantized data inputted from the quantization section 13 and outputs resulting data to an inverse DCT section 22.

The inverse DCT section 22 performs an inverse DCT process for the dequantized data inputted from the dequantization section 21 into original image data and outputs the original image data to an addition section 34 of the reference image production section 17.

In the reference image production section 17, the addition section 34 adds image data inputted from the inverse DCT section 22 and reference image data, which is inputted from a motion compensation buffer section 31 and corresponding to the image data, and outputs resulting data to the motion compensation buffer section 31 through a motion compensation section 32.

The motion compensation buffer section 31 stores the image data inputted from the addition section 34 through the motion compensation section 32 as predictive image data for a next frame.

A motion detection arithmetic operation section 33 detects a motion vector corresponding to the MB inputted from the macro block division section 11 and outputs the motion vector to the motion compensation section 32.

The motion compensation section 32 performs a process for motion compensation based on the motion vector inputted from the motion vector arithmetic operation section 33. In particular, the motion compensation section 32 reads out reference image data, which is corresponding to the data of the MB inputted to the subtraction section 19, from among the predictive image data stored in advance in the motion compensation buffer section 31, based on the motion vector inputted from the motion detection arithmetic operation section 33, and outputs the reference image data to the subtraction section 19.

In the quantization scale determination section 18, a complexity arithmetic operation section 46 calculates, based on the VLC inputted from the transmission buffer section 15, a complexity as a parameter representative of complicacy of the VLC and outputs the complexity to a complexity buffer section 45.

The complexity buffer section 45 temporarily stores the complexity inputted from the complexity arithmetic operation section 46 and suitably outputs the complexity to a target code amount arithmetic operation section 41.

The target code amount arithmetic operation section 41 calculates a target code amount based on the complexity inputted from the complexity buffer section 45 and outputs the target code amount to a quantization index arithmetic operation section 42.

The quantization index arithmetic operation section 42 calculates a quantization index based on the target code amount inputted from the target code amount arithmetic operation section 41 and outputs the quantization index to a quantization scale arithmetic operation section 43.

An activity arithmetic operation section 44 calculates an activity as a parameter representative of complicacy of data of each of the MBs inputted from the macro block division section 11 and outputs the activity to the quantization scale arithmetic operation section 43.

The quantization scale arithmetic operation section 43 calculates a quantization scale based on the quantization index inputted from the quantization index arithmetic operation section 42 and the activity inputted from the activity arithmetic operation section 44 and outputs the quantization scale to the quantization section 13.

Subsequently, operation of the image coding apparatus 1 is described.

Frame data are inputted to the macro block division section 11 and converted into data in a unit of an MB and then outputted to the subtraction section 19.

Reference image data inputted from the reference image production section 17 to the subtraction section 19 are subtracted from the data of the MB inputted to the subtraction section 19, and data of the difference between them is outputted to the DCT section 12.

The difference data inputted to the DCT section 12 is converted into a DCT coefficient, and the DCT coefficient is outputted to the quantization section 13. The DCT coefficient inputted to the quantization section 13 is quantized based on a quantization scale inputted from the quantization scale arithmetic operation section 43 to the quantization section 13 and then inputted to the VLC section 14.

The quantized data inputted to the VLC section 14 is converted into a VLC, and the VLC is outputted to the transmission buffer section 15.

The VLC inputted to the transmission buffer section 15 is outputted to the complexity arithmetic operation section 46. When VLCs of the entire frame are inputted to the transmission buffer section 15, the VLCs are converted into data in a unit of a frame, and the data are outputted as bit stream data to the outside.

The quantized data inputted from the quantization section 13 to the dequantization section 21 is dequantized and outputted to the inverse DCT section 22. The dequantized data inputted to the inverse DCT section 22 is converted back into original image data, and the original image data is outputted to the addition section 34.

The image data inputted to the addition section 34 is added to the reference image data (that is, the reference image data obtained by the subtraction from the data of the MB by the subtraction section 19) stored in the motion compensation buffer section 31 in advance and then decoded.

The decoded data of the MB is inputted to the motion compensation buffer section 31 through the motion compensation section 32 and stored as predictive image data of an MB of a frame to be processed subsequently.

The motion detection arithmetic operation section 33 detects a motion vector corresponding to the data of the MB inputted from the macro block division section 11 and outputs the motion vector to the motion compensation section 32.

By the motion compensation section 32, a process of motion compensation corresponding to the motion vector inputted from the motion detection arithmetic operation section 33 is performed. In particular, from within the predictive image data stored in advance in the motion compensation buffer section 31, the predictive image data at a position displaced by an amount corresponding to the motion vector from the position of the MB is read out, and the predictive image data is outputted as reference image data for the MB to the subtraction section 19.

The quantization scale determination section 18 performs the following three process, that is, so-called TM5 (Test Model 5) processes of the MPEG to calculate a quantization scale of the MB and outputs the quantization scale of the MB to the quantization section 13.

(Step 1)

The target code amount arithmetic operation section 41 calculates, based on the value of the complexity of the VLC of the MB inputted from the complexity buffer section 45 and processed at the k-th (the MB processed at the k−1th is hereinafter referred to as MB-k−1), a target code amount for the MB-k, and outputs the target code amount to the quantization index arithmetic operation section 42.

(Step 2)

The quantization index arithmetic operation section 42 calculates a virtual buffer occupation amount of the MB-k, based on the target code amount for the MB-k inputted from the target code amount arithmetic operation section 41.

Further, the quantization index arithmetic operation section 42 calculates a quantization index of the MB-k based on the virtual buffer occupation amount of the MB-k and outputs the quantization index of the MB-k to the quantization scale arithmetic operation section 43.

(Step 3)

The quantization scale arithmetic operation section 43 calculates a quantization scale, based on the quantization index of the MB-k inputted from the quantization index arithmetic operation section 42 and the value of the activity of the MB-k inputted from the activity arithmetic operation section 44, and outputs the quantization scale to the quantization section 13.

Incidentally, it is known that the degree of the distribution of the information amount in a frame to be coded has a relationship to the visual perceptibility of the frame, that is, the picture quality.

However, the image coding apparatus 1 calculates the quantization scales of the MBs without referring to the distribution of the information amount of the frame and uses the calculated quantization scales to quantize the individual MBs.

For example, when the MB-k is quantized based on the quantization scale of the MB-k, the quantization scale of the MB-k (the quantization scale is hereinafter referred to as MQUANT-k) is calculated at the (step 3) of the TM5 in accordance with the following expression (1):

$$MQUANT\text{-}k = (2 \times \text{activity-}k + avgact)/(\text{activity-}k + 2 \times avgact) \times Q\text{-}k \quad (1)$$

activity-k represents the activity of the MB-k, and avgact represents the average value of the activities in the frame. Further, Q-k represents the quantization index of the MB-k.

In particular, the image coding apparatus 1 multiplies the quantization index by a coefficient having a fixed amplitude (in the example of the expression (1), "(2×activity-k+avgact)/(activity-k+2×avgact)" which ranges from 0.5 to 2) to calculate the quantization scale without depending upon the distribution of the information amount of the frame.

It is to be noted that the "coefficient by which the quantization index is multiplied in order to calculate the quantization scale" is hereinafter referred to as "coefficient of the quantization index" and the "range in which the quantization index can vary" is hereinafter referred to as "range of the quantization index".

For example, in the expression (1) given hereinabove, the "coefficient of the quantization index" is "(2×activity-k+avgact)/(activity-k+2×avgact)," and the "range of the quantization index" is "0.5 to 2".

As a result, there is a problem that the visual perceptibility of a frame coded by the image coding apparatus 1 is degraded.

DISCLOSURE OF THE INVENTION

The present invention has been made taking such a situation as described above into consideration and makes it possible to improve the picture quality of an image.

An image coding apparatus of the present invention is characterized in that the image coding apparatus comprises first arithmetic operation means for calculating a variance of value of a parameter representative of complicacy of block, storage means for storing the variance of the value of the parameter calculated by the first arithmetic operation means, and second arithmetic operation means for calculating a range of a quantization index of the block based on the variance of the value of the parameter stored by said storage means.

In the image coding apparatus of the present invention, the parameter is a motion vector residual of the block.

In the image coding apparatus of the present invention, the parameter may be an activity representative of complicacy of the block.

In the image coding apparatus of the present invention, the second arithmetic operation means may calculate the range of the quantization index discretely.

An image coding method of the present invention is characterized in that the image coding method comprises a first arithmetic operation step of calculating a variance of value of a parameter representative of complicacy of block, a storage step of storing the variance of the value of the parameter calculated by the process at the arithmetic operation step, and a second arithmetic operation step of calculating a range of a quantization index of the block using the variance of the value of the parameter stored by the process at the storage step.

A recording medium of a recording medium is characterized in that a program thereof comprises a first arithmetic operation step of calculating a variance of value of a parameter representative of complicacy of the block, a storage step of storing the variance of the value of the parameter calculated by the process at the arithmetic operation step, and a second arithmetic operation step of calculating a range of a quantization index of the block using the variance of the value of the parameter stored by the process at the storage step.

A program of the present invention is characterized in that the program causes a computer to execute a first arithmetic operation step of calculating a variance of value of a parameter representative of complicacy of block, a storage step of storing the variance of the value of the parameter calculated by the process at the arithmetic operation step, and a second arithmetic operation step of calculating a range of a quantization index of the block using the variance of the value of the parameter stored by the process at the storage step.

In the image coding apparatus and method, recording medium and program of the present invention, a quantization index of a block is calculated based on a variance of value of a parameter representative of complicacy of block.

BEST MODE FOR CARRYING OUT THE INVENTION

Figure 2:
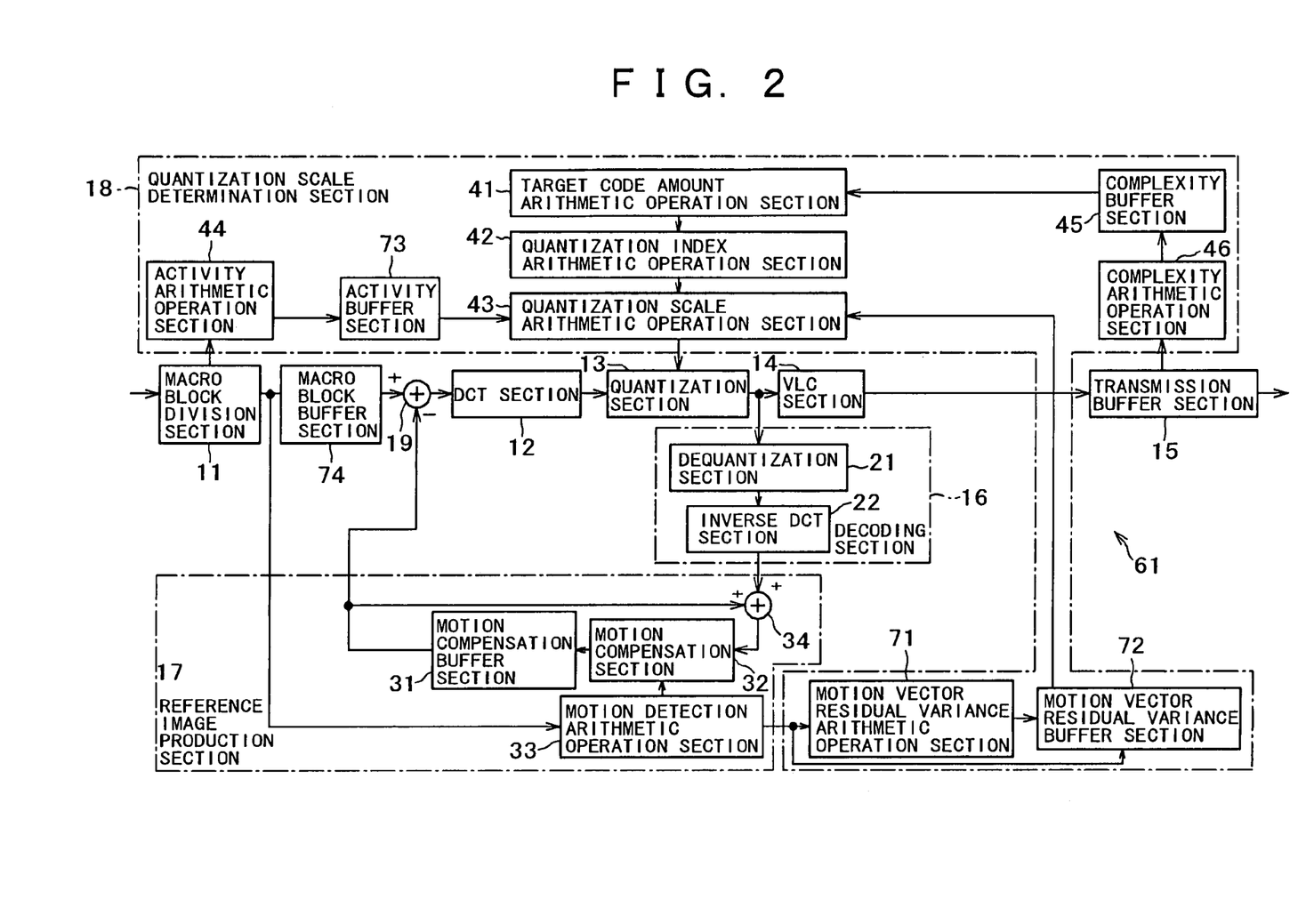
FIG. 2 is a block diagram showing an example of a configuration of an image coding apparatus to which the present invention is applied.

FIG. 2 shows an example of a configuration of an image coding apparatus 61 to which the present invention is applied. Elements which correspond to those of the conventional image coding apparatus 1 of FIG. 1 are denoted by the same reference numerals, and description of them is suitably omitted.

As shown in FIG. 2, the image coding apparatus 61 includes, in addition to the components of the image coding apparatus 1 of FIG. 1, a motion vector residual variance arithmetic operation section 71, a motion vector residual variance buffer section 72, an activity buffer section 73 and a macro block buffer section 74.

In the example of FIG. 2, when compared with the conventional example of FIG. 1, the motion detection arithmetic operation section 33 detects a motion vector corresponding to data of each of MBs inputted from the macro block division section 11 (a motion vector of an MB) and outputs the motion vector to the motion compensation section 32. Further, the motion detection arithmetic operation section 33 calculates a motion vector residual of each MB and outputs the motion vector residual to the motion vector residual variance arithmetic operation section 71.

The motion vector residual variance arithmetic operation section 71 calculates the variance of the motion vector residuals of the MBs inputted from the motion detection arithmetic operation section 33. Further, the motion vector residual variance arithmetic operation section 71 calculates the amplitude coefficient, based on the variance of the motion vector residuals of the MBs, and outputs amplitude coefficient to the motion vector residual buffer section 72.

The motion vector residual variance buffer section 72 temporarily stores the amplitude coefficient inputted from the motion vector residual variance arithmetic operation section 71 and suitably outputs the amplitude coefficient to the quantization scale arithmetic operation section 43.

The macro block buffer section 74 temporarily stores the data of the MBs inputted from the macro block division section 11 and suitably outputs them to the subtraction section 19.

The activity buffer section 73 is hereinafter described.

The other configuration is similar to that in the case of FIG. 1.

Figure 3:
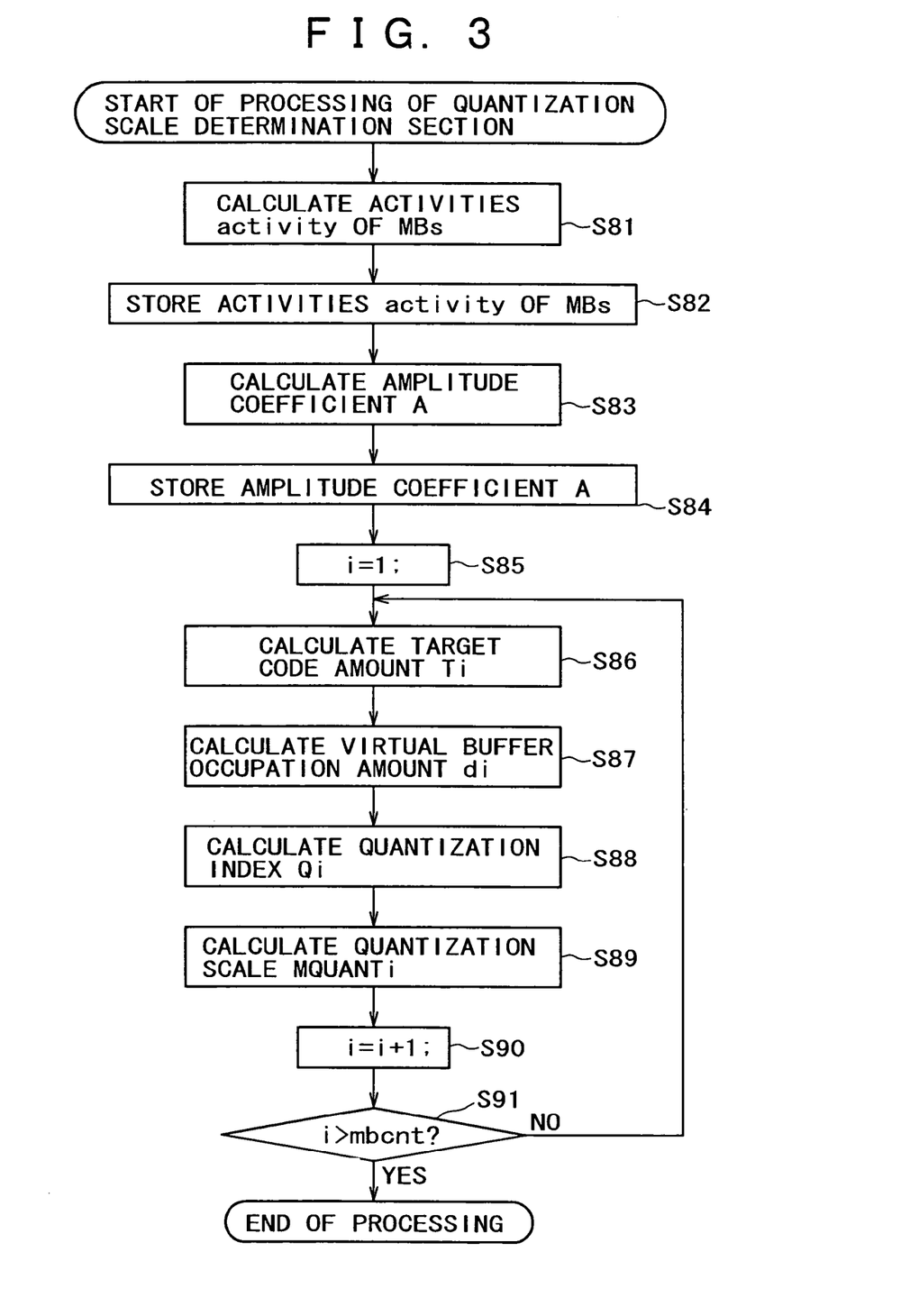
FIG. 3 is a flow chart illustrating a process of a quantization scale determination section of the image coding apparatus of FIG. 2.

Subsequently, operation of the quantization scale determination section 18 of the image coding apparatus 61 of FIG. 2 is described with reference to a flow chart of FIG. 3 (since the other process is similar to that in the case of FIG. 1, description thereof is omitted).

As described hereinabove, the macro block division section 11 receives frame data as an input thereto and converts the inputted frame data into data of MBs.

In the present example, frame data of one frame are converted into data of mbcnt MBs.

The macro block division section 11 outputs the data of the MB-1 to MB-mbcnt to the macro block buffer section 74, activity arithmetic operation section 44 and motion detection arithmetic operation section 33.

At this time, the activity arithmetic operation section 44 calculates, based on the data of the MB-1 to MB-mbcnt inputted from the macro block division section 11, activities of them (the activity of the MB-k is hereinafter referred to as activity-k) and outputs the activities to the activity buffer section 73 at step S81 of FIG. 3.

At step S82, the activity buffer section 73 stores the activities activity-1 to activity-mbcnt inputted from the activity arithmetic operation section 44.

On the other hand, the motion detection arithmetic operation section 33 calculates, based on the data of the MB-1 to MB-mbcnt inputted from the macro block division section 11, motion vector residuals of them (the motion vector residual of the MB-k is hereinafter referred to as bdv-k), and outputs the motion vector residuals, bdv-1 to bdv-mdcnt, to the motion vector residual variance arithmetic operation section 71.

At this time, at step S83, the motion vector residual variance arithmetic operation section 71 calculates the variance of the motion vector residuals (the variance is hereinafter referred to as bdv-var) based on the motion vector residuals btv-1 to bdv-mbcnt inputted from the motion detection arithmetic operation section 33 and further calculates the amplitude coefficient A based on the variance bdv-var of the motion vector residuals, and outputs the amplitude coefficient A to the motion vector residual variance buffer section 72.

Figure 4:
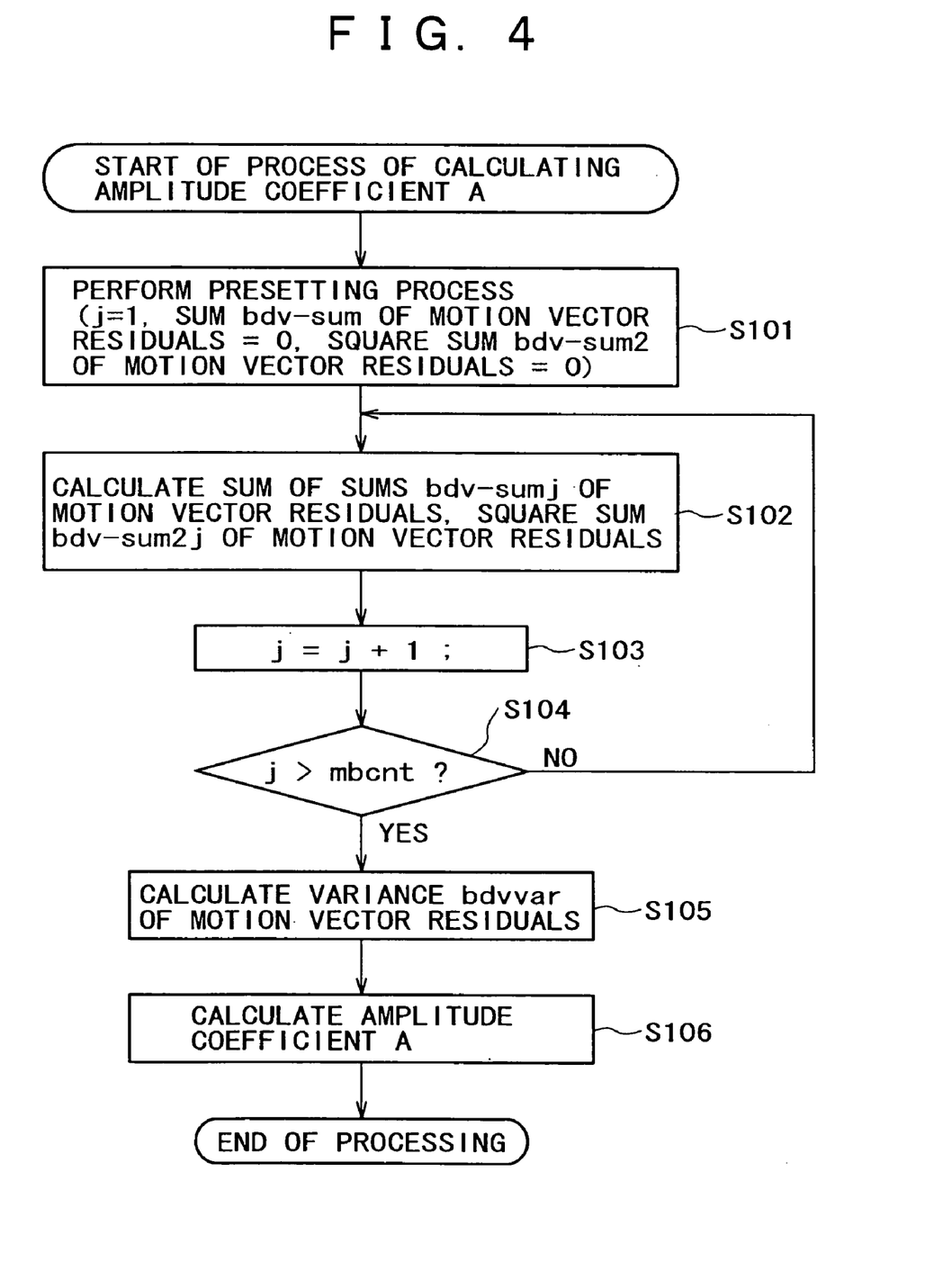
FIG. 4 is a flow chart illustrating details of a process of calculating an amplitude coefficient A at step S83 of FIG. 3.

Details of the process at step S83, that is, the process for calculating the amplitude coefficient A in the present example, are illustrated in FIG. 4. Thus, the details of the process for calculating the amplitude coefficient A are described with reference to a flow chart of FIG. 4.

First, at step S101, for example, such a preset process as described below is performed.

In particular, at step S101, a count value j of a counter (not shown) is initialized to 1.

Further, the motion vector residual variance arithmetic operation section 71 sets the initial value bdv-sum-0 for the sum of motion vector residuals (the jth sum of motion vector residuals is hereinafter referred to as bdv-sum-j) to 0 and the initial value bdv-sum2-0 for the square sum of motion vector residuals (the jth square sum of motion vectors is hereinafter referred to as bdv-sum2-j) to 0.

At step S102, the motion vector residual variance arithmetic operation section 71 calculates the sum bdv-sum-1 of the motion vector residuals and the square sum bdv-sum2-1 of the motion vector residuals in accordance with, for example, the following expressions (2) and (3), respectively, based on the motion vector residual bdv-1 inputted from the motion detection arithmetic operation section 33:

$$bdv\text{-sum-}1 = 0(bdv\text{-sum-}0) + bdv\text{-}1 \quad (2)$$

$$bdv\text{-sum2-}1 = 0(bdv\text{-sum2-}0) + bdv\text{-}1 \times bdv\text{-}1 \quad (3)$$

After the arithmetical operation of the sum bdv-sum-1 of the motion vector residuals and the square sum bdv-sum2-1 of the motion vector residuals is completed, the counter increments its count value j by one (in the present case, to j=2) at step S103.

Then at step S104, a discrimination section (not shown) of the quantization scale determination section 18 discriminates whether or not the count value j exceeds the mbcnt.

If it is discriminated at step S104 that the count value j does not exceed the mbcnt (if it is discriminated that the count value j is equal to or less than the mbcnt), then the motion vector residual variance arithmetic operation section 71 returns its processing to step S102 and repeats the processes at the steps beginning with step S102.

In particular, until after the count value j is counted to j=mbcnt, the motion vector residual variance arithmetic operation section 71 calculates, repetitively at step S102, the sum bdv-sum-j of the motion vector residuals and the square sum bdv-sum2-j of the motion vector residuals, for example, in accordance with the following expressions (4) and (5):

$$bdv\text{-sum-}j = bdv\text{-sum-}j\text{-}1 + bdv\text{-}j \quad (4)$$

$$bdv\text{-sum2-}j = bdv\text{-sum-}j\text{-}1 + bdv\text{-}j \times bdv\text{-}j \quad (5)$$

Then, if it is discriminated at step S104 that the count value j exceeds the mbcnt, that is, if the sum bdv-sum-mbcnt of the motion vector residuals and the square sum bdv-sum2-mbcnt of the motion vector residuals are calculated, then the motion vector residual variance arithmetic operation section 71 calculates, at step S105, the variance bdv-var of the motion vector residuals in accordance with the following expression (6):

$$bdv - \text{var} = (bdv - sum2 - mbcnt/mbcnt) - \qquad (6)$$
$$(bdv - sum - mbcnt/mbcnt) \times$$
$$(bdv - sum - mcbnt/mbcnt)$$

At step S106, the motion vector residual variance arithmetic operation section 71 calculates the amplitude coefficient A, based on the variance bdv-var of the motion vector residuals calculated by the process at step S105, and outputs the calculated amplitude coefficient A to the motion vector residual variance buffer section 72.

The amplitude coefficient A is calculated, for example, discretely based on the range of the variance bdv-var of the motion vector residuals. In other words, the predetermined amplitude coefficient A is a coefficient determined regarding the variance bdv-var of the motion vector residuals within a fixed range as a fixed value.

In the present example, for example, where the variance bdv-var of the motion vector residuals is less than 6,000, the amplitude coefficient A is calculated as 1; where the variance bdv-var of the motion vector residuals is equal to or more than 6,000 but less than 12,000, the amplitude coefficient A is 2 (standard value of the TM5); where the variance bdv-var of the motion vector residuals is equal to or more than 12,000 but less than 18,000, the amplitude coefficient A is calculated as 3; and where the variance bdv-var of the motion vector residuals is equal to or more than 18,000, the amplitude coefficient A is calculated as 4.

Referring back to FIG. 3, after the amplitude coefficient A is calculated by the process at step S83 in such a manner as described above, the motion vector residual variance buffer section 72 records, at step S84, the amplitude coefficient A inputted from the motion vector residual variance arithmetic operation section 71.

It is to be noted that, if the processes at steps S81 to S84 are completed before the coding process of the MB-1 (first MB) is performed, then the order of the processes at steps S81 and S82 and at steps S83 and S84 is not limited particularly.

When the processes at steps S81 to S84 are completed, the counter (not shown) is initialized to the count value i of 1 at step S85.

Thereafter, if the quantization scale determination section 18 calculates the quantization scale of the MB-i (the quantization scale is hereinafter referred to as MQUANT-i) through processes at steps S86 to S89, then the count value i of the counter is incremented by 1 at step S90.

Details of the processes at steps S86 to S89 are hereinafter described.

At step S91, the discrimination section (not shown) of the quantization scale determination section 18 discriminates whether or not the count value i exceeds the mbcnt.

If it is discriminated at step S91 that the count value i exceeds the mbcnt, then the quantization scale determination section 18 ends its processing.

On the other hand, if it is discriminated at step S91 that the count value i does not exceed the mbcnt (if it is discriminated that the count value i is equal to or less than the mbcnt), then the quantization scale determination section 18 returns its processing to step S86 so that the processes at the steps beginning with step S86 are repeated.

For example, if the count value i now is i=k, then the quantization scale MQUANT-k is calculated by the processes at steps S86 to S89 as described hereinabove.

In particular, at step S86, the target code amount arithmetic operation section 41 calculates the target code amount of the MB-k (the target code amount is hereinafter referred to as Tk) based on the complexity supplied from the complexity 45 and outputs the calculated target code amount Tk to the quantization index arithmetic operation section 42.

At step S87, the quantization index arithmetic operation section 42 calculates the virtual buffer occupation amount of the MB-k (the virtual buffer occupation amount is hereinafter referred to as dk) based on the target code amount Tk inputted from the target code amount arithmetic operation section 41.

At step S88, the quantization index arithmetic operation section 42 calculates the quantization index of the MB-k (the quantization index is hereinafter referred to as Q-k) based on the virtual buffer occupation amount dk calculated by the process at step S87, and outputs the quantization index Q-k to the quantization scale arithmetic operation section 43.

At step S89, the quantization scale arithmetic operation section 43 calculates the quantization scale MQUANT-k in accordance with, for example, the following expression (7) based on the quantization index Q-k inputted from the quantization index arithmetic operation section 42, the amplitude coefficient A inputted from the motion vector residual variance buffer section 72 and the activity activity-k inputted from the activity buffer section 73, and outputs the result to the quantization section 13:

$$MQUANT\text{-}k = (A \times \text{activity-}k + \text{avgact}) / (\text{activity-}k + A \times \text{avgact}) \times Q\text{-}k \qquad (7)$$

Then, as described hereinabove, at step S90, the counter counts as j=k+1, and the quantization scale determination section 18 repeats the processes at steps S86 to S90 to calculate the quantization scale MQUANT-k+1.

As described hereinabove, the "coefficient of the quantization index" of the expression (7) is "(A×activity-k+avgact)/ (activity-k+A×avgact)", and the "range of the quantization index" can be varied in accordance with the value of the amplitude coefficient A.

For example, where the amplitude coefficient A is 1, the "range of the quantization index" of the expression (7) is "1 (constant)", and the quantization scale MQUANT-k coincides with the quantization index Q-k.

On the other hand, where the amplitude coefficient A is more than 1, the "range of the quantization index" of the expression (7) is "1/A to A".

The relationship between the amplitude coefficient A and the range of the quantization index calculated by the image coding apparatus 61 of FIG. 2 having such a configuration as described above is illustrated in FIG. 5.

Figure 5:
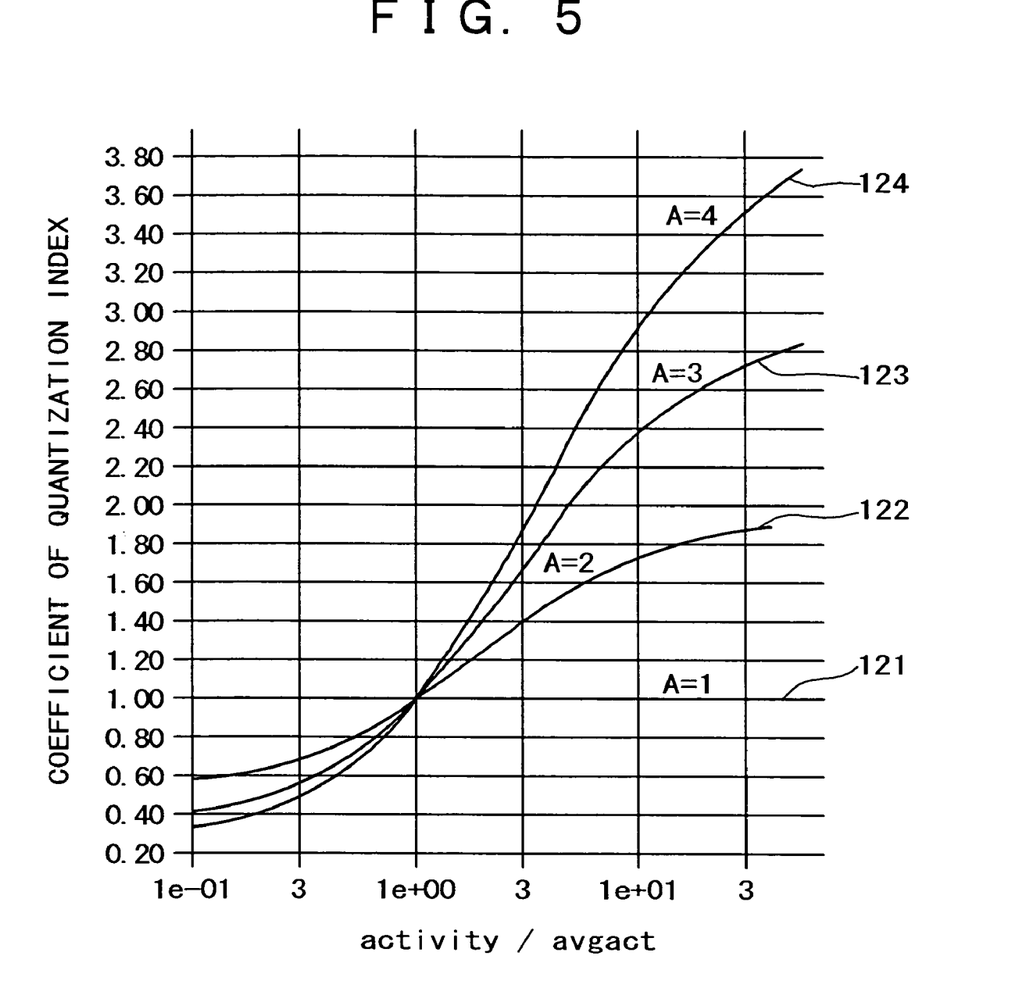
FIG. 5 is a view illustrating a relationship between the amplitude coefficient A calculated by the image coding apparatus of FIG. 3 and the range of the quantization index.

The axis of abscissa of FIG. 5 represents activity/avgact, that is, how many times the average value avgact of the activities in the frame the value of the activity activity is, and the axis of ordinate represents the coefficient of the quantization index.

For example, if data of a frame wherein the variance bdv-var of motion vector residuals is small (less than 6,000), that is, data of a frame wherein the difference between the values of motion vector residuals bdv of MBs is small, are coded, the amplitude coefficient A is arithmetically operated as 1 by the process at step S106 as described hereinabove.

In this instance (where the amplitude coefficient A is 1), as indicated by a curve 121, the coefficients of the quantization indices of all MBs are 1, and the quantization scales of the MBs in the frame are calculated as a substantially fixed value.

As a result, the frame can be coded into a frame within which block noise on the boundary of an activity variation is less visible.

On the other hand, where data of a frame wherein the variance bdv-var of motion vector residuals is large, that is, data of a frame wherein the dispersion between the values of the motion vector residuals bdv of the MBs is large, are coded, the amplitude coefficient A is calculated to 2 to 4 depending upon the degree of the magnitude of the dispersion by the process at step S106.

In particular, where the variance bdv-var of the motion vector residuals is equal to or more than 6,000 but less than 12,000, the amplitude coefficient A is calculated as 2, and the range of the quantization index becomes 0.5 to 2 as indicated by a curve 122.

Where the variance bdv-var of motion vector residuals is equal to or more than 12,000 but less than 18,000, the amplitude coefficient A is calculated as 3, and the range of the quantization index becomes ⅓ to 3 as indicated by a curve 123.

Further, where the variance bdv-var of motion vector residuals is equal to or more than 18,000, the amplitude coefficient A is calculated as 4, and the range of the quantization index becomes 0.25 to 4 as indicated by a curve 124.

As described above, as the variance bdv-var of motion vector residuals increases, that is, as the dispersion of the values of the motion vector residuals bdv of the MBs increases, the range of the quantization index increases and also the dispersion of the quantization scales of the MBs thus calculated increases.

As a result, data of a frame wherein the dispersion of the values of the motion vector residuals bdv of the MBs are greater are quantized such that the information amount of an MB having a high activity activity is reduced by a greater amount.

In this manner, the image coding apparatus 61 of FIG. 2 can improve the visual perceptibility of an image, that is, the picture quality, when compared with the conventional image coding apparatus 1 of FIG. 1.

In the series of processes described above, for example, where data of each frame are a picture of one of data of an I picture, data of a P picture and data of a B picture, when the data of the frames are inputted in a predetermined period (in the example of FIG. 6, 1/30 [s]) into the macro block division section 11 in such an order as given below, the data of the frames are coded in such an order as given below.

Figure 6:
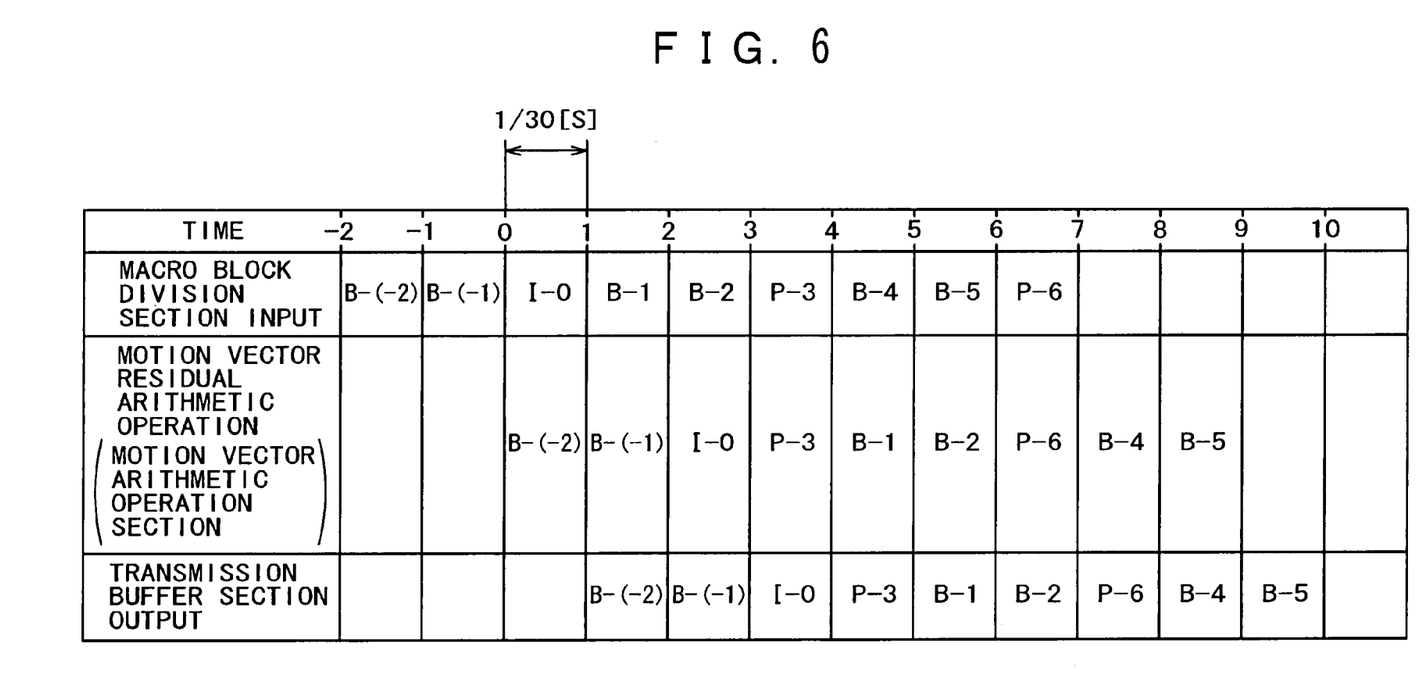
FIG. 6 is a view illustrating an order of a process of frames coded by the image coding apparatus of FIG. 3.

In the following description, an I picture is represented by I, a P picture by P and a B picture by B, and the order of the process of each picture is added to the right side.

In particular, it is assumed that data of the frames are inputted to the macro block division section 11 in the order of (B-(−2), B-(−1), I-0, B-1, B-2, P-3, B-4, B-5, P-6, . . . ) as shown in FIG. 6. However, the time at which I-0 is inputted is used as a reference (0).

In this instance, at time 0, the motion detection arithmetic operation section 33 detects the motion vector of B-(−2) and calculates a motion vector residual. Thereafter, a motion vector is detected for each one frame in the following order, and a motion vector residual is calculated.

In particular, with reference to time 0, a motion vector is detected in the order of (B-(−2), B-(−1), I-0, P-3, B-1, B-2, P-6, B-4, B-5, . . . ) for each one frame, and a motion vector residual is calculated.

In this manner, prior to a B picture (for example, B-1 and B-2, B-4 and B-5, and so forth), a motion vector of a P picture (for example, P-3 with respect to B-1 and B-2, or P-3 with respect to B-4 and B-5) is detected and a motion vector residual is calculated.

Then, in the order wherein the motion vectors described above are detected and the motion vector residuals are calculated, that is, in the order of (B-(-2), B-(-1), I-0, P-3, B-1, B-2, P-6, B-4, B-5, ... ), data of the frames are coded and outputted from the transmission buffer section 15 (in order words, before coding is performed, arithmetic operation of motion vectors and residuals of them necessary for such coding must be completed).

It is to be noted that the timing at which data of the frame of B-(-2) are coded and outputted from the transmission buffer section 15 is the time 1, and thereafter, data of the frames are processed and coded in the order described above for each frame.

While the series of processes described above can be executed by hardware, it may otherwise be executed by software. In this instance, for example, an image coding apparatus 131 is formed from such a personal computer as shown in FIG. 7.

Figure 7:
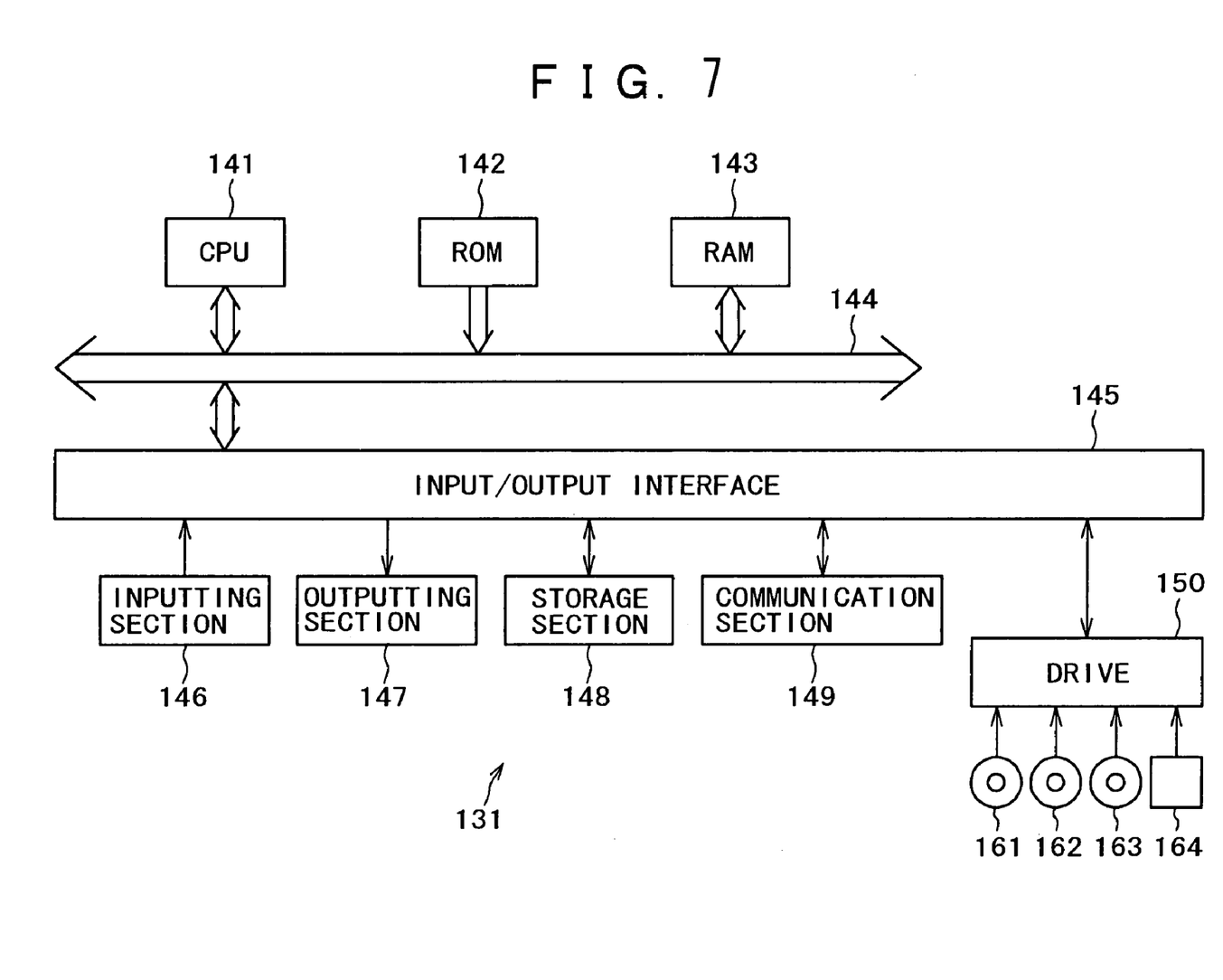
FIG. 7 is a block diagram showing another example of a configuration of the image coding apparatus to which the present invention is applied.

Referring to FIG. 7, a CPU (Central Processing Unit) 141 executes various processes in accordance with a program stored in a ROM (Read Only Memory) 142 or a program having been loaded from a storage section 148 into a RAM (Random Access Memory) 143. In the RAM 143, also data necessary for the CPU 141 to execute various processes and so forth are stored suitably.

The CPU 141, ROM 142 and RAM 143 are connected to each other by a bus 144. Also an input/output interface 145 is connected to the bus 144.

An inputting section 146 comprising a keyboard, a mouse and so forth, an outputting section 147 comprising a display unit such as a CRT or an LCD unit and a speaker or the like, a storage section 148 formed from a hard disk or the like, and a communication section 149 formed from a modem, a terminal adapter or the like are connected to the input/output interface 145. The communication section 149 performs a communication process through a network including the Internet.

Also a drive 150 is connected to the input/output interface 145 as occasion demands, and a magnetic disk 161, an optical disk 162, a magneto-optical disk 163, a semiconductor memory 164 or the like is suitably loaded into the drive 150 and a computer program read out from those is installed into the storage section 148 as occasion demands.

Where the series of processes is executed by software, a program which constructs the software is installed from a network or a recording medium into a computer incorporated in hardware for exclusive use or, for example, a personal computer for universal use which can execute various functions by installing various programs.

The recording medium is formed as a package medium such as, as shown in FIG. 7, a magnetic disk 161 (including a floppy disk), an optical disk 162 (including a CD-ROM (Compact Disc-Read Only Memory) and a DVD (Digital Versatile Disk)), or a magneto-optical disk 163 (including an MD (Mini-Disk)), or a semiconductor memory 164 which has the program recorded thereon or therein and is distributed in order to provide the program to a user separately from an apparatus body. Else, the recording medium is formed as a ROM 142 having the program stored therein, a hard disk included in the storage section 148, or the like which are provided to a user in a state wherein they are incorporated in the apparatus body in advance.

It is to be noted that, in the present specification, the steps which describe the program stored in a recording medium may be but need not necessarily be processed in a time series in the order as described, and include processes which are executed in parallel or individually without being processed in a time series.

INDUSTRIAL APPLICABILITY

As described above, according to the image coding apparatus and method of the present invention, since the range of a quantization index of a block is calculated based on a variance of the value of a parameter representative of complicacy of the block, the picture quality of an image can be improved.

The invention claimed is:

1. An image coding apparatus for coding an image in a unit of a block, characterized in that said image coding apparatus comprises:
    first arithmetic operation means for calculating a value of a first parameter representative of complicacy of the block;
    second arithmetic operation means for calculating a variance of value of a second parameter representative of complicacy of the block;
    storage means for storing the variance of the value of the second parameter calculated by said second arithmetic operation means; and
    third arithmetic operation means for calculating a range of a quantization index of the block based on the value of the first parameter and the variance of the value of the second parameter stored by said storage means,
    wherein the range of the quantization index varies in accordance with a coefficient value calculated discretely based on the range of the variance of the motion vector residuals, such that when the coefficient value is 1, the range of the quantization index is a constant and when the coefficient value is greater than 1 the range of the quantization index is between the coefficient value and the reciprocal of the coefficient value, and
    wherein said third arithmetic operation means calculates the range of the quantization index discretely based on the range of the variance of the motion vector residuals such that the coefficient is predetermined as calculated from the variance of the motion vector residuals within a fixed range as a fixed value.

2. An image coding apparatus according to claim 1, characterized in that the second parameter is a motion vector residual of the block.

3. An image coding apparatus according to claim 1, characterized in that the first parameter is an activity representative of complicacy of the block.

4. An image coding method for an image coding apparatus which codes an image in a unit of a block, characterized in that the image coding method comprises:
    a first arithmetic operation step of calculating a value of a first parameter representative of complicacy of the block;
    a second arithmetic operation step of calculating a variance of value of a second parameter representative of complicacy of the block;
    a storage step of storing the variance of the value of the second parameter calculated by the process at the second arithmetic operation step;
    a third arithmetic operation step of calculating a range of a quantization index of the block using the value of the first parameter and the variance of the value of the second parameter stored by the process at the storage step;
    a coding step of transforming the image into a coded image based on the range of the quantization index of the block, such that block noise on the boundary of a block is less visible; and
    an outputting step of outputting the coded image as a bit stream, wherein the range of the quantization index varies in accordance with a coefficient value calculated discretely based on the range of the variance of the motion vector residuals, such that when the coefficient value is 1, the range of the quantization index is a constant and when the coefficient value is greater than 1 the range of the quantization index is between the coefficient value and the reciprocal of the coefficient value, and wherein said third arithmetic operation step calculates the range of the quantization index discretely based on the range of the variance of the motion vector residuals such that the coefficient is predetermined as calculated from the variance of the motion vector residuals within a fixed range as a fixed value.

5. A computer program product, comprising a computer usable recording medium having a computer readable program code embodied therein, said computer readable program code adapted to be executed to implement an image coding method that codes an image in a unit of a block, said method comprising:

a first arithmetic operation step of calculating a value of a first parameter representative of complicacy of the block;

a second arithmetic operation step of calculating a variance of value of a second parameter representative of complicacy of the block;

a storage step of storing the variance of the value of the second parameter calculated by the process at the second arithmetic operation step;

a third arithmetic operation step of calculating a range of a quantization index of the block using the value of the first parameter and the variance of the value of the second parameter stored by the process at the storage step;

a coding step of transforming the image into a coded image based on the range of the quantization index of the block, such that block noise on the boundary of a block is less visible; and an outputting step of outputting the coded image as a bit stream, wherein the range of the quantization index varies in accordance with a coefficient value calculated discretely based on the range of the variance of the motion vector residuals, such that when the coefficient value is 1, the range of the quantization index is a constant and when the coefficient value is greater than 1 the range of the quantization index is between the coefficient value and the reciprocal of the coefficient value, and wherein said third arithmetic operation step calculates the range of the quantization index discretely based on the range of the variance of the motion vector residuals such that the coefficient is predetermined as calculated from the variance of the motion vector residuals within a fixed range as a fixed value.

6. An image coding apparatus for coding an image in a unit of a block, characterized in that said image coding apparatus comprises:

a first arithmetic operation device configured to calculate a value of a first parameter representative of complicacy of the block;

a second arithmetic operation device configured to calculate a variance of value of a second parameter representative of complicacy of the block;

a storage device configured to store the variance of the value of the second parameter calculated by said second arithmetic operation device; and third arithmetic operation device configured to calculate a range of a quantization index of the block based on the value of the first parameter and the variance of the value of the parameter stored by said storage device, wherein the range of the quantization index varies in accordance with a coefficient value calculated discretely based on the range of the variance of the motion vector residuals, such that when the coefficient value is 1, the range of the quantization index is a constant and when the coefficient value is greater than 1 the range of the quantization index is between the coefficient value and the reciprocal of the coefficient value, and wherein said third arithmetic operation device calculates the range of the quantization index discretely based on the range of the variance of the motion vector residuals such that the coefficient is predetermined as calculated from the variance of the motion vector residuals within a fixed range as a fixed value.

* * * * *